Feb. 6, 1940.   J. K. NATTSON   2,188,955
APPARATUS FOR COOLING BAKERY PRODUCTS
Filed June 15, 1936
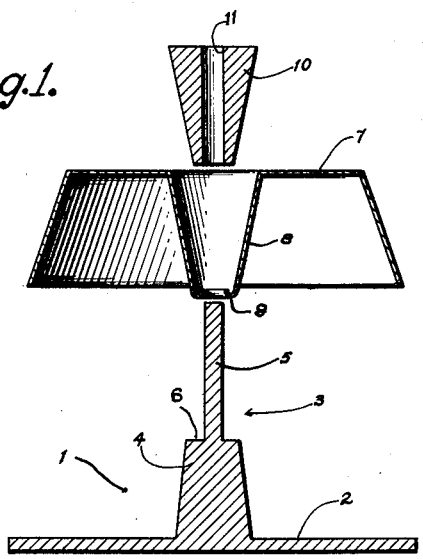
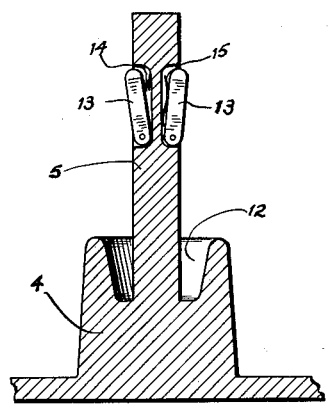
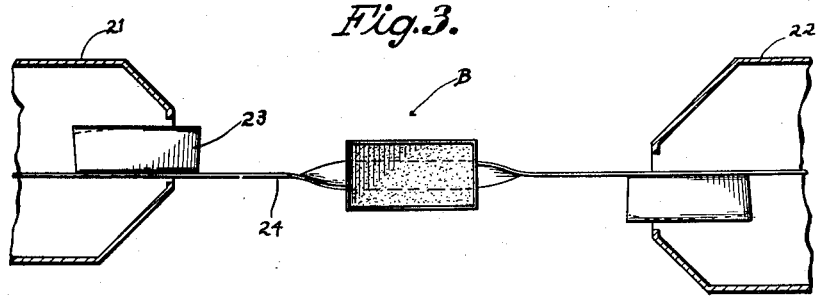
INVENTOR
JENNY K. NATTSON
BY
Harold P. Swanson
ATTORNEY Patented Feb. 6, 1940

2,188,955

UNITED STATES PATENT OFFICE 2,188,955

APPARATUS FOR COOLING BAKERY PRODUCTS

Jenny K. Nattson, Arlington, Mass.

Application June 15, 1936, Serial No. 85,257

3 Claims. (Cl. 65—15)

The invention relates in general to a process for cooling bakery products and, in particular, to a process for cooling sponge, angel and like cakes and to correlated improvements in means for carrying out the process.

Heretofore it has been the general practice in baking cakes, bread and the like to deposit the baked product on a surface, such as a grill or the like, shortly after withdrawing the baked product from the oven and then cooling the product under atmospheric or other conditions. The weight of the upper portion of the cake or bread is exerted on the lower portion and due to the plastic or fragile nature of the product before being cooled the undesirable result is obtained whereby the texture of the product is greatly impaired. The walls forming the cell structure are compressed resulting in a doughy product and in many cases these walls collapse thus causing crumbling.

The general object of the invention is to provide a process which not only preserves but greatly enhances the texture of sponge, angel and like cakes.

A specific object of the invention is to provide a process which increases the lightness and fluffiness of sponge, angel and like cakes.

Another object of the invention is to provide a process which will tend to prevent a bakery product from falling during cooling.

A further object of the invention is to provide a process of cooling a bakery product whereby the cell structure of the product is not injured.

Another object of the invention is to provide means for carrying out the process of cooling sponge, angel and like cakes and bakery products.

Other objects of the invention will in part be obvious and will in part appear hereinafter.

According to the invention the process comprises cooling a bakery product while the product is freely suspended from the interior surfaces of the container in which the product was baked. The invention also comprises novel means for carrying out the cooling process.

The invention accordingly comprises the several steps and relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawing, in which:

Fig. 1 shows an exploded view, in cross-section, of a cake cooler of the invention.

Fig. 2 illustrates, in part and in cross-section, another cake cooler of the invention.

Fig. 3 illustrates, in part, continuous apparatus of the invention for baking and cooling bakery products.

In carrying out the invention the sponge, angel or like cake is removed from the oven after completion of the baking operation and the product is now inverted and maintained in this position during the cooling operation. During such cooling the product freely hangs from the inner surfaces of the container, the container being maintained in a substantially vertical position. The forces of gravity are, of course, exerted downwardly within the product and these forces tend to expand the minute cells, thus providing an increased fluffiness and a lighter final product. The product, which adheres to the interior of the baking pan during cooling, will not "fall" and the walls of the cell structure will not collapse. The term "fall" or "falling" is used in the bakery trade to denote the collapse or crushing of the cell wall structure.

While the process of this invention is admirably adapted for cooling sponge and angel cakes, which normally adhere to the walls of the container in which they are baked, it is within the contemplation of the invention to employ the hereindisclosed process for cooling any bakery product that will normally adhere to a baking pan or any product which can be caused to adhere to a baking pan.

Referring now to the drawing and especially to Fig. 1, where there is disclosed an exploded view of one modification of a complete apparatus for carrying out the process of this invention in which 1 denotes a stand having a base 2 and a vertical shaft 3 having an enlarged lower section 4 and a smaller upper section 5, an abutment 6 being formed at the junction of the sections 4 and 5. A conventional baking pan 7 having a frusto-conical center element 8 is shown inverted and in position to be placed on the stand 1 so that the terminus 9 of the element 8 will contact and be supported by the abutment 6. After the pan 7 has been placed in this inverted and substantially vertical position on the stand, there may be applied to the upper section 5 a centering element 10 having a hole 11 bored therethrough and adapted to telescope over the upper section 5 of the shaft 3. A cake which has been baked in the pan 7 may now be cooled while the cake hangs and adheres to the inner surfaces of the pan.

Other means of centering the pan 7 on the stand may be employed, as shown in Fig. 2, wherein a hollowed-out portion 12 is provided in the section 4. The side walls of the portion 12 are tapered to substantially conform with the taper of the element 8 of the pan 7. From this structure, it may be seen that the pan 7 is lowered in an inverted position so that the element 8 fits within the portion 12, thus maintaining the pan 7 in the proper position. Another modification of the centering means is also shown in Fig. 2 wherein three or more fingers 13 are mounted on the section 5. In this arrangement, an abutment 6 as is shown in Fig. 1 is employed and the pan 7 is placed on the stand and held in position by fingers 13 caused to contact the inner surfaces of the frusto-conical element 8 by the action of coil springs 14 or leaf springs 15.

A continuous process of baking and cooling may be carried out by means of the apparatus shown in Fig. 3 wherein 21 denotes a baking oven and 22 a cooling chamber. A plurality of cake pans 23 are mounted on a continuous belt or conveyor 24 which passes through the baking oven and is then automatically inverted at B and then passed into the cooling chamber. If it is desirable not to pass the heated conveyor into the cooling chamber, two or more conveyors may be provided and suitable means for transferring the pans from one conveyor to another.

While a conventional-shaped baking pan has been shown, it is obvious that the process is not dependent on any particular shape of pan employed. The support shown in Figs. 1 and 2 may be manufactured of any suitable material such as wood, cast or sheet metal, rubber, cellulose derivatives, synthetic resins, moldable fibrous plastic compositions, etc.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. As an article of manufacture, a cake cooler comprising a base portion having a substantially vertical shaft mounted thereon, said shaft having an enlarged lower section and smaller upper section, the junction of the sections providing an abutment adapted to support an inverted cake baking pan of the type having a hollow frustated tapering center element.

2. A device of the class described, a cake cooler for supporting an inverted baking pan of the type having a hollow frustated tapering center element, comprising a base portion, a substantially vertical shaft extending upwardly therefrom and means cooperating with said shaft and the internal area of said center element to maintain the center element of the baking pan in a substantially vertical plane.

3. As an article of manufacture, a cake cooler comprising, in combination, a substantially vertical member mounted on a base, said vertical member having an enlarged portion adapted to receive and support an inverted cake pan of the type having a hollow frustated tapering center element and means cooperable with said vertical member and the inner portion of the center element to maintain the center element of the cake pan in a substantially vertical plane.

JENNY K. NATTSON.